(12) United States Patent
Lin

(10) Patent No.: US 11,860,397 B1
(45) Date of Patent: Jan. 2, 2024

(54) LIGHT GUIDE MODULE

(71) Applicant: Primax Electronics Ltd., Taipei (TW)

(72) Inventor: Jia-Hung Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/220,992

(22) Filed: Jul. 12, 2023

(30) Foreign Application Priority Data

Jun. 12, 2023 (TW) .................................. 112121901

(51) Int. Cl.
 *F21V 8/00* (2006.01)
(52) U.S. Cl.
 CPC ......... *G02B 6/0041* (2013.01); *G02B 6/0025* (2013.01); *G02B 6/0066* (2013.01)
(58) Field of Classification Search
 CPC ... G02B 6/0041; G02B 6/0025; G02B 6/0066
 See application file for complete search history.

(56) References Cited

U.S. PATENT DOCUMENTS

| | | | |
|---|---|---|---|
| 2015/0109757 A1* | 4/2015 | Chen | H01H 3/125 |
| | | | 362/23.03 |
| 2019/0172663 A1* | 6/2019 | Yeh | H01H 13/023 |
| 2019/0369744 A1* | 12/2019 | Wu | G02B 6/006 |
| 2020/0133077 A1* | 4/2020 | Lin | G02B 6/0041 |
| 2021/0124109 A1* | 4/2021 | Wang | G02F 1/133528 |
| 2022/0035416 A1* | 2/2022 | Pan | G06F 3/0202 |

* cited by examiner

*Primary Examiner* — Evan P Dzierzynski
(74) *Attorney, Agent, or Firm* — KIRTON McCONKIE; Evan R. Witt

(57) ABSTRACT

A light guide module includes a light guide plate, a light-emitting element and a covering layer. The light guide plate includes plural first light-guiding dots and plural second light-guiding dots. The light-emitting element is installed on a lateral edge part of the light guide plate. The covering layer includes a non-shading region, a separation region and a shading region. The plural first light-guiding dots of the light guide plate are aligned with the non-shading region of the covering layer. The plural second light-guiding dots of the light guide plate are aligned with the shading region of the covering layer. The plural second light-guiding dots are covered by the shading region of the covering layer.

17 Claims, 6 Drawing Sheets

LIGHT GUIDE MODULE

FIELD OF THE INVENTION

The present invention relates to a light guide module.

BACKGROUND OF THE INVENTION

Nowadays, the inner portions of many electronic products are equipped with light guide structures to produce the illumination function. The light guide structure comprises a light guide plate. Generally, a periphery region of the light guide plate has a non-functional region. Moreover, positioning lines are printed on the non-functional region, or positioning holes are formed in the non-functional region. During the process of stacking and attaching the light guide plate, the positioning lines or the positioning holes are used as alignment marks. Due to the alignment marks, the process of stacking and attaching the light guide plate can be well performed. Consequently, the misalignment problem and the defects will be avoided, and the luminous effect can be enhanced.

Generally, after the process of stacking and attaching the light guide plate is completed, the alignment marks are deleted or erased. Consequently, in the subsequent product inspection process, it is necessary to additionally use a high-precision testing instrument. In other words, the alignment accuracy cannot be checked quickly, and the operators in the production line cannot detect defective products immediately.

SUMMARY OF THE INVENTION

For solving the drawbacks of the conventional technologies, the present invention provides a light guide module. In the light guide module, plural light-guiding dots are installed or printed on the light guide plate and served as the alignment marks. The light-guiding dots are installed on the regions that need to be precisely aligned. The light-guiding dots are distributed on the light output region or the non-light output region of the light guide plate. The light-guiding dots are used as the alignment marks. Since the light-guiding dots are small in volume, it is not necessary to delete or erase the alignment marks (i.e., the light-guiding dots), and the luminous effect of the finished product will not be adversely affected. In the subsequent process, the alignment calibration and inspection are performed according to the illumination conditions at the making positions of the light-guiding dots. In other words, it is not necessary to provide an additional high-precision testing instrument.

In accordance with an aspect of the present invention, a light guide module is provided. The light guide module includes a base plate, a light guide plate, a light-emitting element and a covering layer. The light guide plate is installed on the base plate. The light guide plate includes plural first light-guiding dots and plural second light-guiding dots. The light-emitting element is installed on a lateral edge part of the light guide plate. The light guide plate is covered by the covering layer. The covering layer includes a non-shading region, a separation region and a shading region. The separation region is arranged between the non-shading region and the shading region. The non-shading region and the shading region are separated from each other by the separation region. The plural first light-guiding dots of the light guide plate are aligned with the non-shading region of the covering layer. The plural second light-guiding dots of the light guide plate are aligned with the shading region of the covering layer. The plural second light-guiding dots are covered by the shading region of the covering layer.

In an embodiment, the light guide plate further includes plural third light-guiding dots, and the plural third light-guiding dots are aligned with the separation region of the covering layer.

In an embodiment, when the plural second light-guiding dots are covered by the shading region of the covering layer, the plural third light-guiding dots are exposed to the separation region of the covering layer.

In an embodiment, the plural third light-guiding dots are arranged between the plural first light-guiding dots and the plural second light-guiding dots.

In an embodiment, the plural third light-guiding dots are arranged between the plural second light-guiding dots.

In an embodiment, the plural second light-guiding dots are aligned with an edge of the shading region of the covering layer.

In an embodiment, the plural first light-guiding dots, the plural second light-guiding dots and the plural third light-guiding dots are distributed on a whole plate of the light guide plate.

In an embodiment, a distribution density of the plural first light-guiding dots corresponding to the non-shading region of the covering layer is higher than a distribution density of the plural second light-guiding dots corresponding to the shading region of the covering layer.

In an embodiment, the light guide module further includes a pattern layer. The pattern layer is located over the covering layer. The pattern layer includes a text region and an opaque region. The text region is aligned with the non-shading region of the covering layer. The opaque region is aligned with the shading region and the separation region of the covering layer.

In an embodiment, the light guide module further includes a bottom layer. The bottom layer is arranged between the base plate and the light guide plate. The bottom layer is an adhesive layer or a reflective coating layer.

In an embodiment, the covering layer is an adhesive layer or a light-shading coating layer.

In accordance with another aspect of the present invention, a light guide module for a touch pad is provided. The light guide module includes a base plate, a pattern layer, a light guide plate, a covering layer and a light-emitting element. The pattern layer is located over the covering layer. The pattern layer includes plural text regions and an opaque region. The light guide plate is arranged between the base plate and the pattern layer. The light guide plate includes plural first light-guiding dot regions and plural second light-guiding dot regions. The plural first light-guiding dot regions are aligned with the corresponding text regions of the pattern layer. The plural second light-guiding dot regions are aligned with the opaque region of the pattern layer. The covering layer is arranged between the pattern layer and the light guide plate. The light guide plate is covered by the covering layer. The covering layer includes plural non-shading regions, plural separation regions and plural shading regions. The plural non-shading regions of the covering layer are aligned with the corresponding first light-guiding dot regions of the light guide plate. The plural shading region of the covering layer are aligned with the corresponding second light-guiding dot regions of the light guide plate. The light-emitting element is installed on a lateral edge part of the light guide plate. The plural first light-guiding dot regions of the light guide plate are exposed to the corresponding non-shading regions of the covering layer and the corresponding text regions of the pattern layer. The plural second light-guiding dot regions of the light guide plate are covered and shaded by the corresponding shading regions of the covering layer. Consequently, the plural second light-guiding dot regions are not exposed to the opaque region of the pattern layer.

In an embodiment, each of the plural first light-guiding dot regions includes plural first light-guiding dots, and each of the plural second light-guiding dot regions includes plural second light-guiding dots. A distribution density of the plural first light-guiding dots in each of the plural first light-guiding dot regions is higher than a distribution density of the plural second light-guiding dots in each of the plural second light-guiding dot regions.

In an embodiment, the plural second light-guiding dots in each of the plural first light-guiding dot regions are aligned with an edge of the corresponding shading region of the covering layer.

In an embodiment, the light guide plate further includes plural third light-guiding dots, and the plural third light-guiding dots are aligned with the plural separation regions of the covering layer.

In an embodiment, each of the plural separation regions of the covering layer is arranged between the corresponding non-shading region of the plural non-shading regions and the corresponding shading region of the plural shading regions, and the corresponding non-shading region and the corresponding shading region are separated from each other by the corresponding separation region.

In an embodiment, the covering layer is an adhesive layer or a light-shading coating layer.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments and accompanying drawings.

Figure 1:
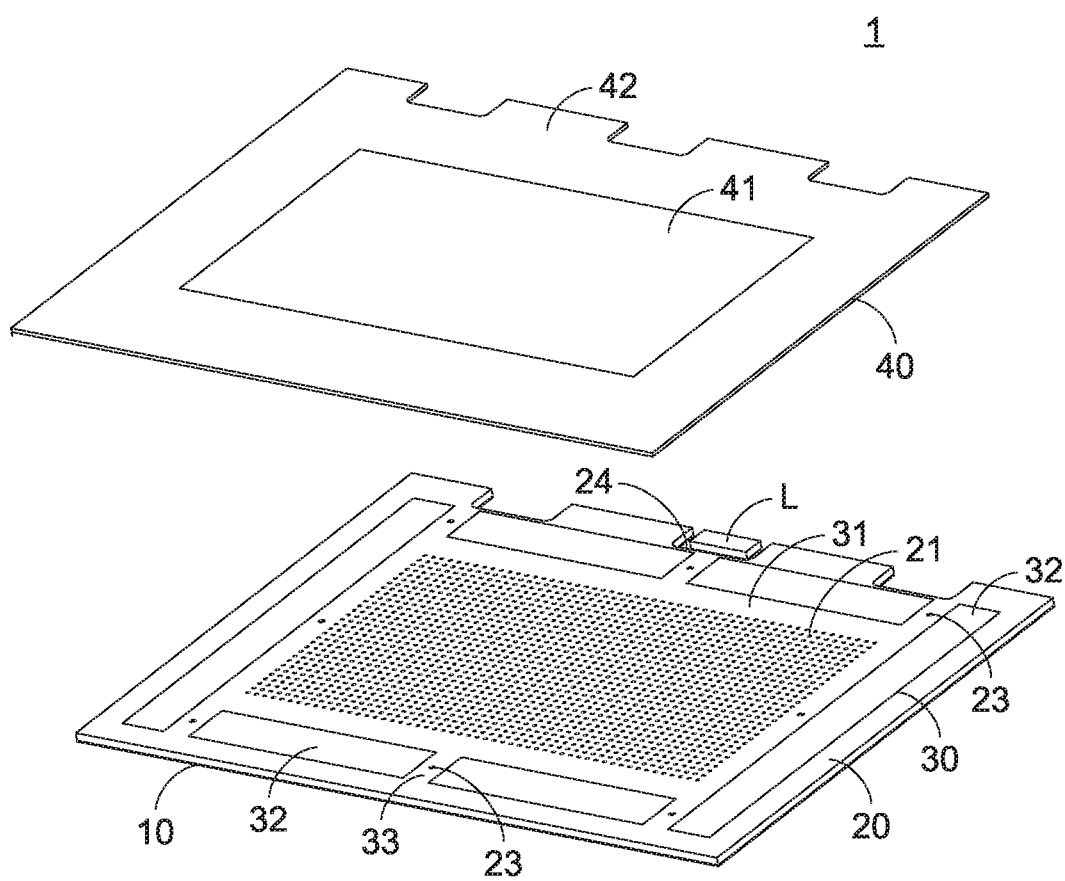
FIG. 1 is a schematic exploded view illustrating a light guide module according to a first embodiment of the present invention.
Figure 2:
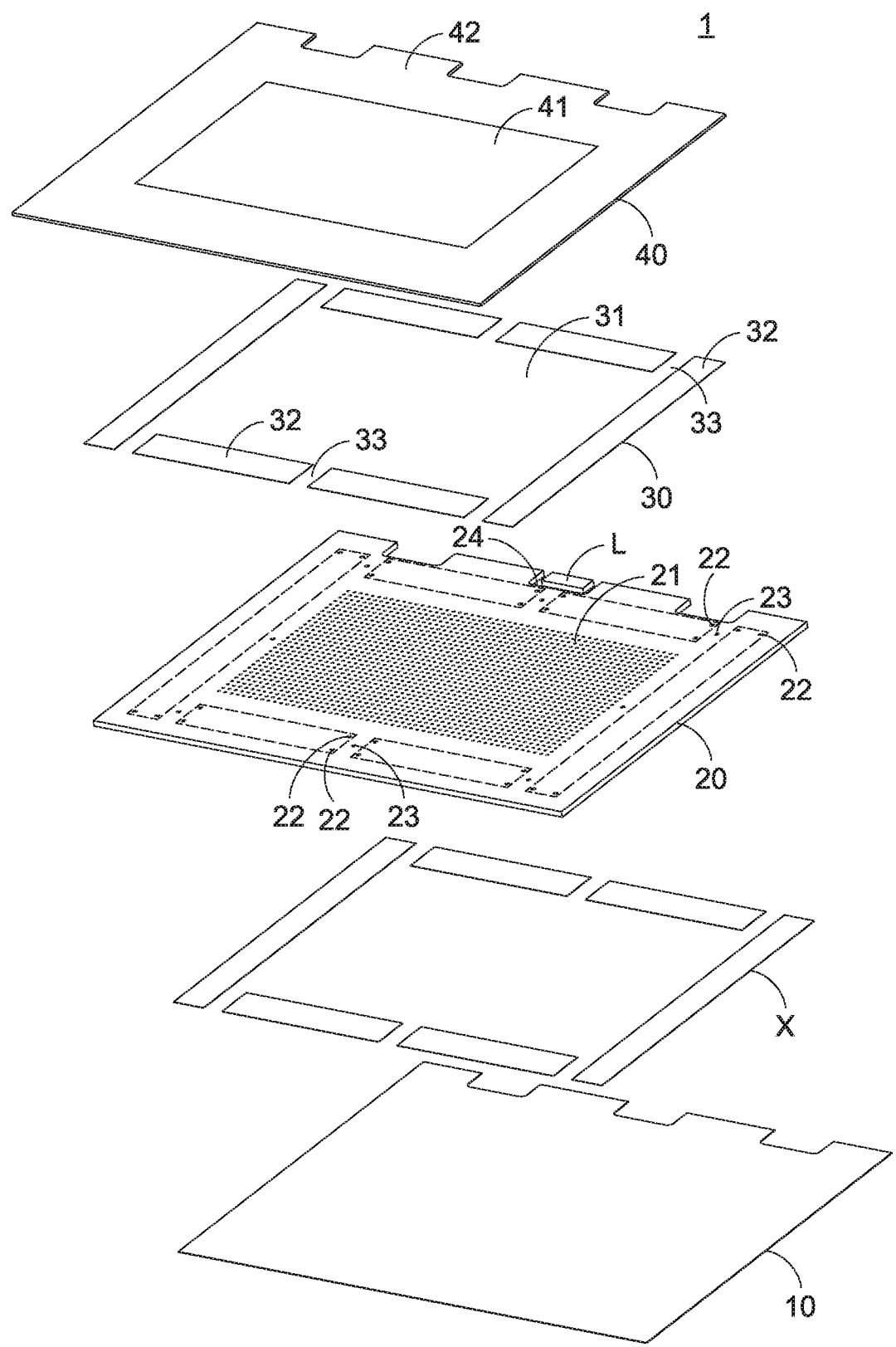
FIG. 2 is a schematic exploded view illustrating the components of the light guide module according to the first embodiment of the present invention.

FIG. 1 is a schematic exploded view illustrating a light guide module according to a first embodiment of the present invention. FIG. 2 is a schematic exploded view illustrating the components of the light guide module according to the first embodiment of the present invention.

In this embodiment, the light guide module 1 comprises a base plate 10, a light guide plate 20, a covering layer 30, a pattern layer 40, a light-emitting element L and a bottom layer X.

The light guide plate 20 comprises plural first light-guiding dots 21, plural second light-guiding dots 22, plural third light-guiding dots 23 and a lateral edge part 24.

The covering layer 30 comprises a non-shading region 31, a shading region 32 and a separation region 33.

The pattern layer 40 comprises a text region 41 and an opaque region 42.

The light guide plate 20 is installed on the base plate 10. The covering layer 30 is located over the light guide plate 20 to cover the light guide plate 20. The plural first light-guiding dots 21 of the light guide plate 20 are aligned with the non-shading region 31 of the covering layer 30. The plural second light-guiding dots 22 of the light guide plate 20 are aligned with the shading region 32 of the covering layer 30. Preferably, the plural second light-guiding dots 22 are aligned with the edge of the shading region 32 of the covering layer 30, and the plural second light-guiding dots 22 are covered by the shading region 32 of the covering layer 30. The plural third light-guiding dots 23 of the light guide plate 20 are aligned with the separation region 33 of the covering layer 30. The text region 41 of the pattern layer 40 is aligned with the non-shading region 31 of the covering layer 30. The opaque region 42 of the pattern layer 40 is aligned with the shading region 32 and the separation region 33 of the covering layer 30.

In the covering layer 30, the separation region 33 is arranged between the non-shading region 31 and the shading region 32. By the separation region 33, the non-shading region 31 and the shading region 32 are separated from each other. The positions of the third light-guiding dots 23 of the light guide plate 20 are determined according to the positions of the separation region 33 of the covering layer 30. In an embodiment, the plural third light-guiding dots 23 are arranged between the plural first light-guiding dots 21 and the plural second light-guiding dots 22. In another embodiment, the plural third light-guiding dots 23 are arranged between the plural second light-guiding dots 22.

The light-emitting element L is installed on the lateral edge part 24 of the light guide plate 20. In addition, the light-emitting element L emits a light beam to the light guide plate 20.

The bottom layer X is arranged between the base plate 10 and the light guide plate 20. In an embodiment, the bottom layer X is an adhesive layer, and the base plate 10 and the light guide plate 20 are combined together through the bottom layer X. In another embodiment, the bottom layer X is a reflective coating layer, and the light beam transferred through the light guide plate 20 can be reflected by the bottom layer X. The base plate 10 is a touch circuit board or a foundation plate.

The covering layer 30 is an adhesive layer or a light-shading coating layer. In case that the covering layer 30 is the adhesive layer, the pattern layer 40 is attached on the light guide plate 20 through the covering layer 30. Generally, the adhesive layer (i.e., the covering layer 30) is made of an opaque or semi-transparent adhesive material. Since the light beam cannot be easily transmitted through the adhesive layer, the covering position of the covering layer 30 can be recognized according to the result of judging whether the light-guiding dots on the light guide plate 20 are illuminated or whether the brightness of the light-guiding dots on the light guide plate 20 is weak. In case that the covering layer 30 is the light-shading coating layer, the light beam is not transmitted through the light-shading coating layer. That is, the area of outputting the light beam is limited. Consequently, the covering position of the covering layer 30 can be recognized according to the result of judging whether the light-guiding dots on the light guide plate 20 are shaded and not illuminated.

The plural first light-guiding dots 21, the plural second light-guiding dots 22 and the plural third light-guiding dots 23 are distributed on the whole plate of the light guide plate 20. The plural first light-guiding dots 21, the plural second light-guiding dots 22 and the plural third light-guiding dots 23 are provided to achieve different purposes. In addition, the distribution densities of the plural first light-guiding dots 21, the plural second light-guiding dots 22 and the plural third light-guiding dots 23 of the light guide plate 20 are different.

The distribution density of the plural first light-guiding dots 21 corresponding to the non-shading region 31 of the covering layer 30 is higher than the distribution density of the plural second light-guiding dots 22 corresponding to the shading region 32 of the covering layer 30. The distribution density of the plural third light-guiding dots 23 may be adjusted according to the position of the separation region 33. According to the position of the separation region 33, the distribution density of the plural third light-guiding dots 23 may be higher than or lower than the distribution density of the plural second light-guiding dots 22.

In the first embodiment, the plural first light-guiding dots 21 corresponding to the non-shading region 31 of the covering layer 30 are relatively large in number and closely distributed. That is, the distance between every two first light-guiding dots 21 is small. The plural second light-guiding dots 22 corresponding to the shading region 32 of the covering layer 30 are less in number and loosely distributed. The distance between every two second light-guiding dots 22 is larger than the distance between every two first light-guiding dots 21. The number of the plural third light-guiding dots 23 is less than the number of the plural second light-guiding dots 22. The plural third light-guiding dots 23 are distributed more loosely. The distance between every two third light-guiding dots 23 is larger.

The plural first light-guiding dots 21 of the light guide plate 20 are provided for outputting the light beam. The light beam transferred through the light guide plate 20 is scattered by the plural first light-guiding dots 21. Since the plural first light-guiding dots 21 are distributed the most densely, the greatest portion of the light beam can be outputted. As mentioned above, the plural first light-guiding dots 21 are aligned with the non-shading region 31 of the covering layer 30. Since the light beam is not shaded, the light beam can be projected to the text region 41 of the pattern layer 40, and the text region 41 can be illuminated.

The plural second light-guiding dots 22 of the light guide plate are used for providing the marking and aligning function. Due to the arrangement of the plural second light-guiding dots 22, the positions of the light guide plate 20 to be covered by the shading region 32 of the overing layer 30 are marked and aligned. In other words, the shading region 32 can be placed to cover the accurate positions of the light guide plate 20. Since the position of the shading region 32 is not deviated or the error shading condition of the shading region 32 is avoided, the alignment defects in the stacking process will be avoided. In the normal condition, the second light-guiding dots 22 are shaded by the shading region 32 of the overing layer 30. Consequently, the light beam reflected by the second light-guiding dots 22 will not be transmitted to the pattern layer 40 through the shading region 32 of the overing layer 30.

The plural third light-guiding dots 23 of the light guide plate 20 are used for providing a checking function. For example, according to the third light-guiding dots 23, the tester can check and recognize whether the non-shading region 31 and the shading region 32 of the covering layer 30 are accurately aligned with the predetermined positions. After the light guide plate 20 is covered by the covering layer 30, the tester will check whether the plural third light-guiding dots 23 are covered or whether the light spots from the second light-guiding dots 22 are projected to the peripheries of the plural third light-guiding dots 23. According to the checking result, the tester can recognize the covering conditions of the non-shading region 31 and the shading region 32 of the covering layer 30. Moreover, since the separation region 33 of the covering layer 30 does not provide the shading function, the light beam from the plural third light-guiding dots 23 will not be shaded by the covering layer 30. As mentioned above, the separation region 33 of the covering layer 30 is aligned with the opaque region 42 of the pattern layer 40. Consequently, after the pattern layer 40 is placed over the covering layer 30, the plural third light-guiding dots 23 are still shaded by the opaque region 42 of the pattern layer 40. In other words, the light beam from the plural third light-guiding dots 23 will not be transmitted through the pattern layer 40.

In an embodiment, at least one light-transmissible pattern or at least one text pattern is previously designed in the text region 41 of the pattern layer 40. Moreover, according to the design, the light beam is not permitted to be transmitted through the opaque region 42 of the pattern layer 40. Then, according to the positions of the text region 41 and the opaque region 42 of the pattern layer 40, the corresponding covering layer 30 is designed. That is, the non-shading region 31 and the shading region 32 of the covering layer 30 are respectively aligned with the text region 41 and the opaque region 42 of the pattern layer 40. Then, the light guide plate 20 is stacked on the bottom side of the covering layer 30. Moreover, the plural first light-guiding dots 21 of the light guide plate 20 are aligned with the non-shading region 31 of the covering layer 30, the plural second light-guiding dots 22 of the light guide plate 20 are aligned with the shading region 32 of the covering layer 30, and the plural third light-guiding dots 23 of the light guide plate 20 are aligned with the separation region 33 of the covering layer 30 between the non-shading region 31 and the shading region 32 according to the practical requirements. Then, the covering layer 30 is attached on the light guide plate 20. Then, a testing process is performed. If the plural first light-guiding dots 21, the plural second light-guiding dots 22 and the plural third light-guiding dots 23 are all aligned with the correct positions, a standard product is produced. An example of standard product for the light guide module of the first embodiment will be described with reference to FIG. 3A.

Figure 3A:
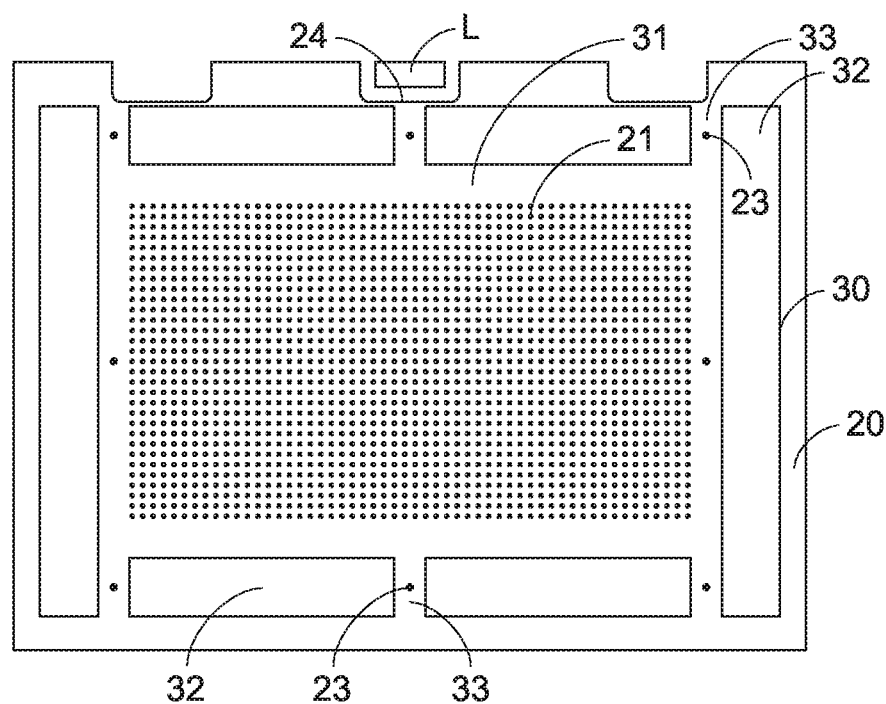
FIG. 3A schematically illustrates a normal situation of the light guide module of the first embodiment, in which the covering layer and the light guide plate are well combined together.
Figure 3B:
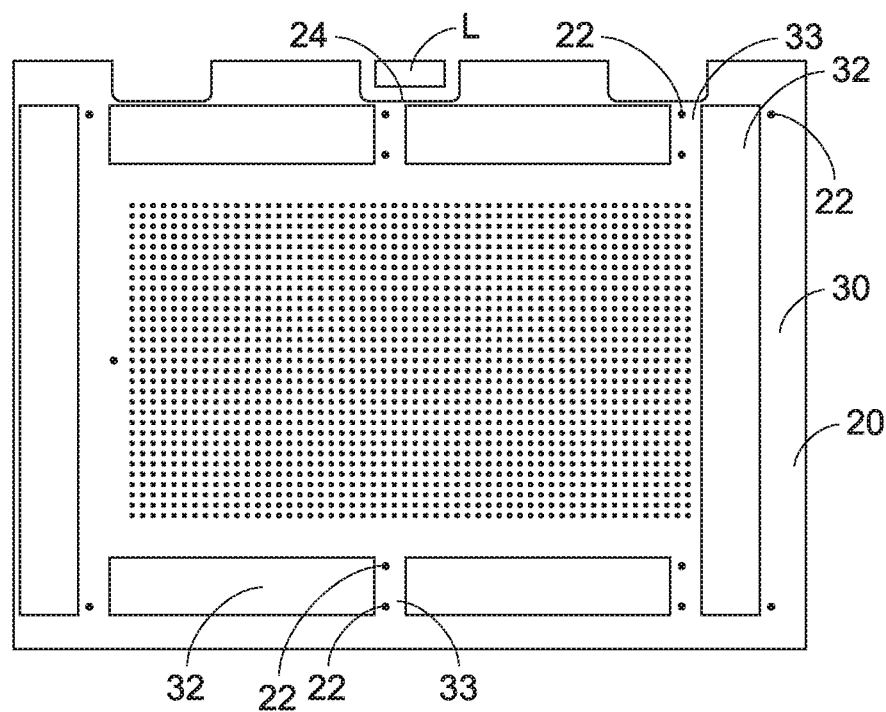
FIG. 3B schematically illustrates a misalignment situation of the light guide module of the first embodiment, in which the covering layer and the light guide plate are misaligned.

FIG. 3A schematically illustrates a normal situation of the light guide module of the first embodiment, in which the covering layer and the light guide plate are well combined together. FIG. 3B schematically illustrates a misalignment situation of the light guide module of the first embodiment, in which the covering layer and the light guide plate are misaligned.

In the situation of FIG. 3A, the covering layer 30 and the light guide plate 20 are well combined together. In the situation of FIG. 3B, the covering layer 30 and the light guide plate 20 are misaligned.

Please refer to FIGS. 2 and 3A. After the light guide plate 20 is covered by the covering layer 30, the plural first light-guiding dots 21 of the light guide plate 20 are exposed to the non-shading region 31 of the covering layer 30, the plural second light-guiding dots 22 of the light guide plate 20 are shaded by and not exposed to the shading region 32 of the covering layer 30, and the plural third light-guiding dots 23 of the light guide plate 20 are exposed to the separation region 33. After the light beam from the light-emitting element L is introduced into the light guide plate 20, the plural first light-guiding dots 21, the plural second light-guiding dots 22 and the plural third light-guiding dots 23 are all illuminated. However, the checking result indicates that only the plural first light-guiding dots 21 and the plural third light-guiding dots 23 are illuminated. Since the plural second light-guiding dots 22 are shaded, the light beam from the plural second light-guiding dots 22 cannot be checked. According to the above judgement criteria, the tester can simply and immediately recognize that the covering layer 30 is attached on the correct position.

Please refer to FIGS. 2 and 3B. After the light guide plate 20 is covered by the covering layer 30, the plural first light-guiding dots 21 of the light guide plate 20 are exposed to the non-shading region 31 of the covering layer 30. However, due to the misalignment, some of the plural second light-guiding dots 22 of the light guide plate 20 are not shaded by the shading region 32 of the covering layer 30 and exposed outside. Moreover, since the plural third light-guiding dots 23 of the light guide plate 20 are shaded by the shading region 32 of the covering layer 30, the plural third light-guiding dots 23 are not exposed to the separation region 33. After the light beam from the light-emitting element L is introduced into the light guide plate 20, the plural first light-guiding dots 21, the plural second light-guiding dots 22 and the plural third light-guiding dots 23 are all illuminated. However, the checking result indicates that some of the plural second light-guiding dots 22 are illuminated. According to standard product shown in FIG. 3A, the tester judges that the abnormal position is illuminated, or the tester judges that the illuminated position is not the predetermined position. Moreover, since the plural third light-guiding dots 23 are shaded and not exposed, the checking result indicates that the plural third light-guiding dots 23 are not illuminated. According to the above judgement criteria, the tester judges that the covering layer 30 is not attached on the correct position. Under this circumstance, the light guide module is determined as a defective product.

Figure 4:
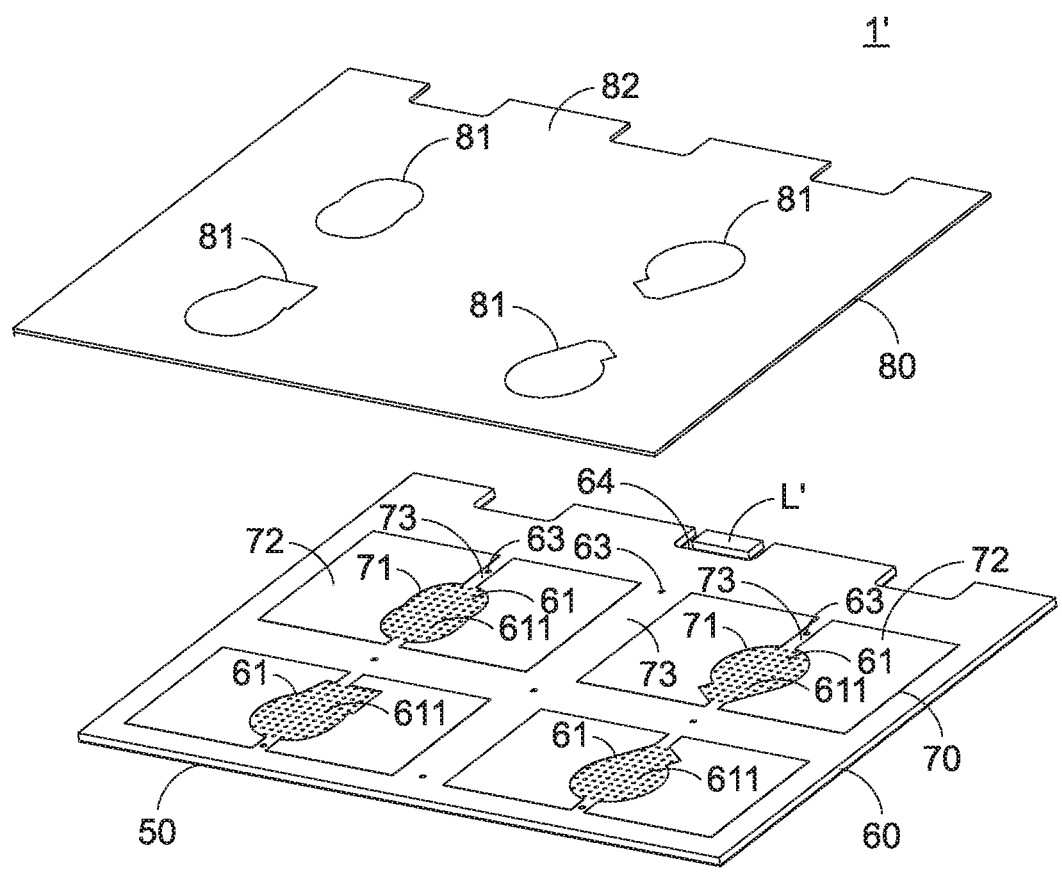
FIG. 4 is a schematic exploded view illustrating a light guide module according to a first embodiment of the present invention.
Figure 5:
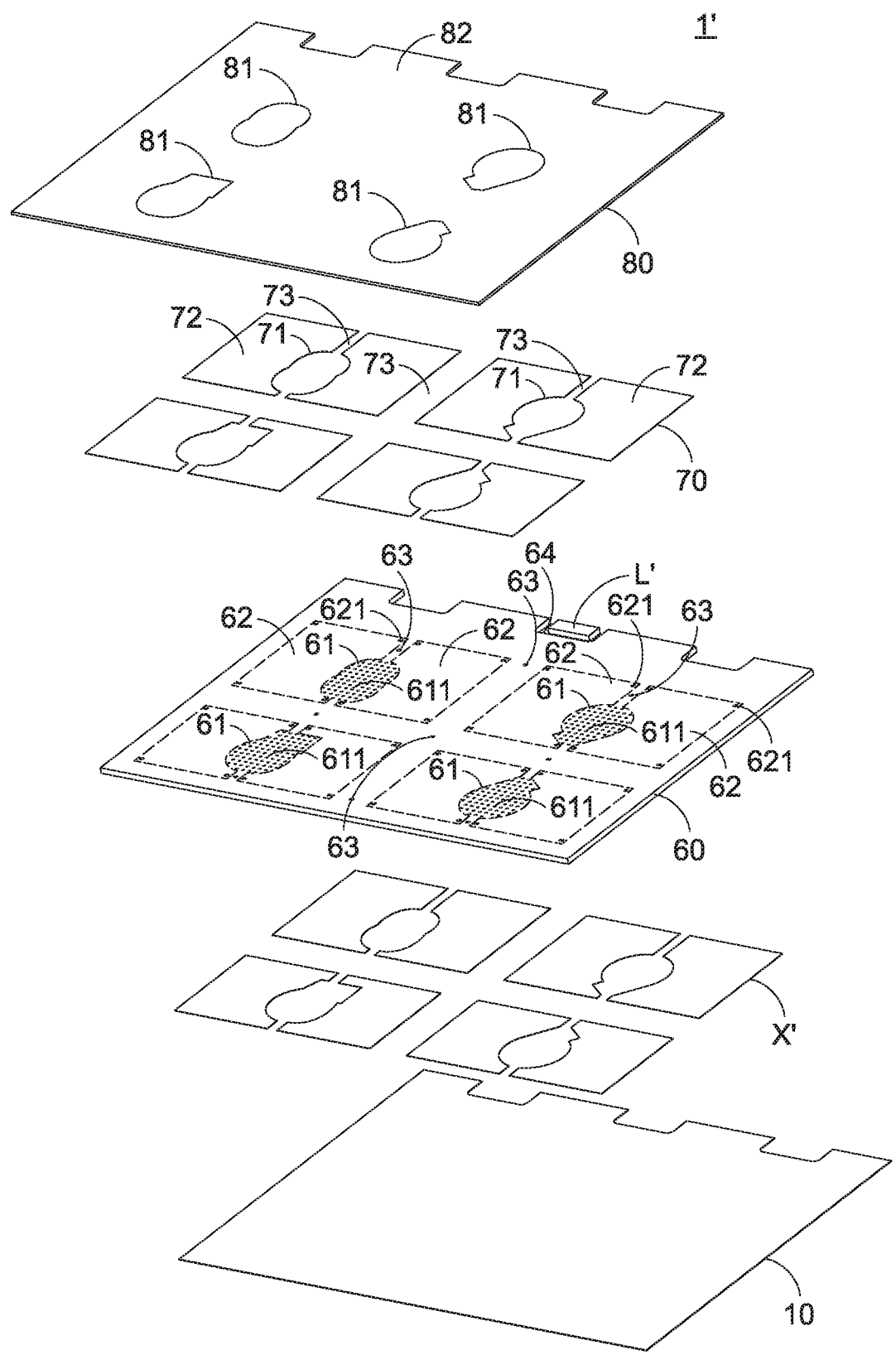
FIG. 5 is a schematic exploded view illustrating the components of the light guide module according to the second embodiment of the present invention.

FIG. 4 is a schematic exploded view illustrating a light guide module according to a first embodiment of the present invention. FIG. 5 is a schematic exploded view illustrating the components of the light guide module according to the second embodiment of the present invention. The light guide module 1' is applied to a touch pad will be described as follows.

The functions, components, manufacturing methods and operations of the light guide module 1' of the second embodiment are substantially identical to those of the light guide module 1 of the first embodiment. For brevity, only the distinguished aspects will be described as follows.

Please refer to FIGS. 4 and 5. In this embodiment, the light guide module 1' for the touch pad comprises a base plate 50, a light guide plate 60, a covering layer 70, a pattern layer 80, a light-emitting element L' and a bottom layer X'.

The light guide plate 60 comprises plural first light-guiding dot regions 61, plural second light-guiding dot regions 62, plural third light-guiding dots 63 and a lateral edge part 64. Each of the plural first light-guiding dot regions 61 comprises plural first light-guiding dots 611. Each of the plural second light-guiding dot regions 62 comprises plural second light-guiding dots 621.

The covering layer 70 comprises plural non-shading regions 71, plural shading regions 72 and plural separation regions 73.

The pattern layer 80 comprises plural text regions 81 and an opaque region 82.

The pattern layer 80 is located over the base plate 50. The light guide plate 60 is arranged between the base plate 50 and the pattern layer 80. The covering layer 70 is arranged between the pattern layer 80 and the light guide plate 60.

The light-emitting element L' is installed on a lateral edge part 64 of the light guide plate 60. In addition, the light-emitting element L' emits a light beam to the light guide plate 60.

The bottom layer X' is arranged between the base plate 50 and the light guide plate 60. The bottom layer X' is an adhesive layer or a reflective coating layer. The covering layer 70 is an adhesive layer or a light-shading coating layer. The base plate 50 is a touch circuit board or a foundation plate.

The plural first light-guiding dot regions 61 of the light guide plate 60 are aligned with the corresponding text regions 81 of the pattern layer 80. The plural second light-guiding dot regions 62 of the light guide plate 60 are aligned with the opaque region 82 of the pattern layer 80.

In the covering layer 70, the plural separation regions 73 are arranged between the corresponding non-shading regions 71 and the corresponding shading regions 72. In addition, the plural non-shading regions 71 and the plural shading regions 72 are separated from each other by the corresponding separation regions 73. The plural separation regions 73 of the covering layer 70 are aligned with the opaque region 82 of the pattern layer 80. The plural non-shading regions 71 of the covering layer 70 are aligned with the corresponding first light-guiding dot regions 61 of the light guide plate 60. The plural shading region 72 of the covering layer 70 are aligned with the corresponding second light-guiding dot regions 62 of the light guide plate 60. Preferably, the plural second light-guiding dots 621 are aligned with the edges of the plural shading regions 72 of the covering layer 70. The plural separation regions 73 of the covering layer 70 are aligned with the plural third light-guiding dots 63 of the light guide plate 60.

Since the plural first light-guiding dot regions 61 of the light guide plate 60 are exposed to the plural non-shading regions 71 of the covering layer 70, the plural first light-guiding dot regions 61 are exposed to the corresponding text regions 81 of the pattern layer 80. In other words, the plural first light-guiding dots 611 in the plural first light-guiding dot regions 61 are exposed outside. Consequently, the light beam from the plural first light-guiding dots 611 can be transmitted through the plural text regions 81 of the pattern layer 80 and outputted to the surroundings. In other words, the plural text regions 81 of the pattern layer 80 provide the luminous effect.

The plural second light-guiding dot regions 62 of the light guide plate 60 are covered and shaded by the corresponding shading regions 72 of the covering layer 70. Consequently, the second light-guiding dot regions 62 are not exposed to the opaque region 82 of the pattern layer 80. In other words, the plural second light-guiding dots 621 in the plural second light-guiding dot regions 62 are shaded. The light beam from the plural second light-guiding dots 621 will not be outputted to the surroundings. The plural third light-guiding dots 73 of the light guide plate 70 are aligned with the plural separation regions 73 of the covering layer 70. Moreover, since the separation regions 73 of the covering layer 70 do not provide the shading function, the light beam from the plural third light-guiding dots 73 will not be shaded by the covering layer 70. As mentioned above, the separation regions 73 of the covering layer 70 are aligned with the opaque region 82 of the pattern layer 80. Consequently, after the pattern layer 80 is placed over the covering layer 70, the plural third light-guiding dots 73 are still shaded by the opaque region 82 of the pattern layer 80. In other words, the light beam from the plural third light-guiding dots 73 will not be transmitted through the pattern layer 80.

The light beam from the plural first light-guiding dot regions 61 of the light guide plate 60 is transmitted through the plural text regions 81 of the pattern layer 80, and thus the plural text regions 81 of the pattern layer 80 provide the luminous effect. The plural second light-guiding dot regions 62 are used for providing the marking and aligning function. The distribution density of the plural first light-guiding dots 611 in the plural first light-guiding dot regions 61 is higher than the distribution density of the plural second light-guiding dots 621 in the plural second light-guiding dot regions 62. Consequently, a greater portion of the light beam is reflected by the plural first light-guiding dots 611. Consequently, the text regions 81 of the pattern layer 80 provide the brighter luminous effect.

Figure 6A:
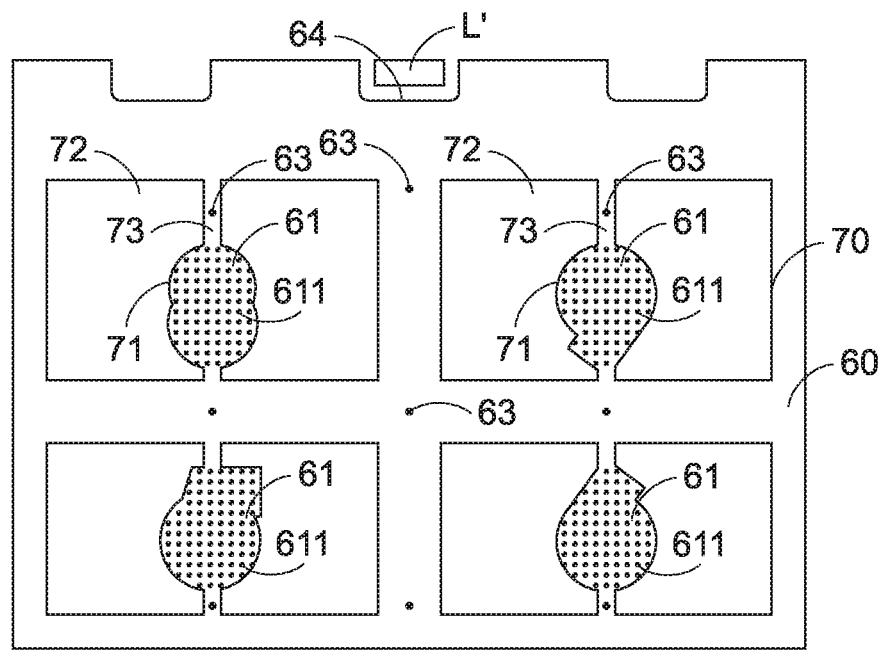
FIG. 6A schematically illustrates a normal situation of the light guide module of the second embodiment, in which the covering layer and the light guide plate are well combined together.
Figure 6B:
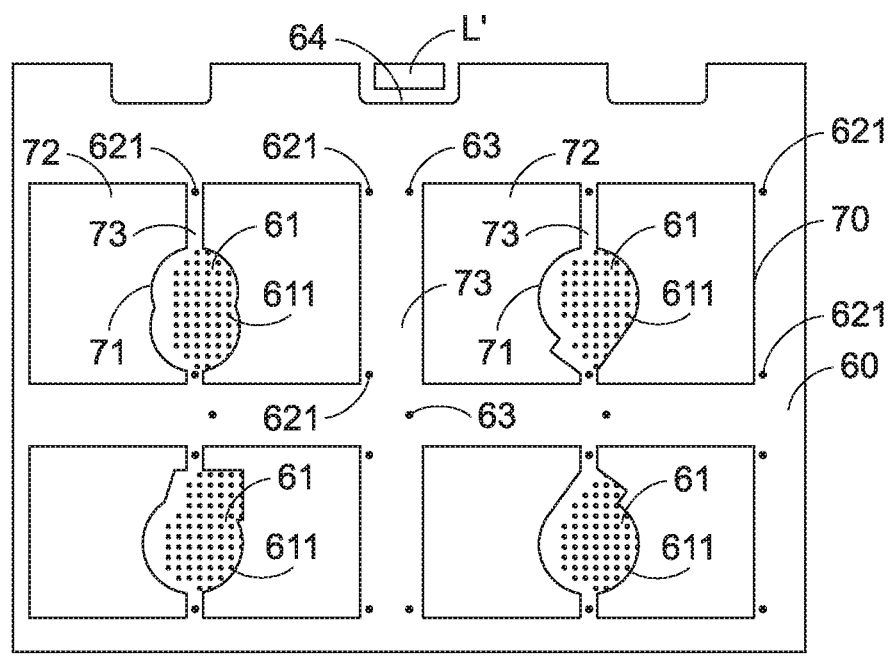
FIG. 6B schematically illustrates a misalignment situation of the light guide module of the second embodiment, in which the covering layer and the light guide plate are misaligned.

FIG. 6A schematically illustrates a normal situation of the light guide module of the second embodiment, in which the covering layer and the light guide plate are well combined together. FIG. 6B schematically illustrates a misalignment situation of the light guide module of the second embodiment, in which the covering layer and the light guide plate are misaligned.

FIG. 6A schematically illustrates a normal situation of the light guide module of the second embodiment, in which the covering layer and the light guide plate are well combined together. FIG. 6B schematically illustrates a misalignment situation of the light guide module of the second embodiment, in which the covering layer and the light guide plate are misaligned.

Please refer to FIGS. 5 and 6A. After the light guide plate 60 is covered by the covering layer 70, the plural first light-guiding dots 611 in the first light-guiding dot regions 61 of the light guide plate 60 are exposed to the plural non-shading regions 71 of the covering layer 70, the plural second light-guiding dots 621 in the plural second light-guiding dot regions 62 of the light guide plate 60 are shaded by and not exposed to the shading regions 72 of the covering layer 70, and the plural third light-guiding dots 63 of the light guide plate 60 are exposed to the separation regions 73 of the covering layer 70. After the light beam from the light-emitting element L' is introduced into the light guide plate 60, the plural first light-guiding dots 71, the plural second light-guiding dots 72 and the plural third light-guiding dots 73 are all illuminated. However, the checking result indicates that only the plural first light-guiding dots 71 and the plural third light-guiding dots 73 are illuminated. Since the plural second light-guiding dots 72 are shaded, the light beam from the plural second light-guiding dots 72 cannot be checked. According to the above judgement criteria, the tester can simply and immediately recognize that the covering layer 70 is attached on the correct position.

Please refer to FIGS. 5 and 6B. After the light guide plate 60 is covered by the covering layer 30, the plural first light-guiding dots 611 in the first light-guiding dot regions 61 of the light guide plate 60 are exposed to the non-shading regions 71 of the covering layer 70. However, due to the misalignment, some of the plural second light-guiding dots 621 in the plural second light-guiding dot regions 62 of the light guide plate 60 are not shaded by the shading region 72 of the covering layer 70 and exposed outside. Moreover, since some of the plural third light-guiding dots 63 of the light guide plate 60 are shaded by the shading regions 72 of the covering layer 70, the third light-guiding dots 63 are not exposed to the separation region 73. Alternatively, the positions of the plural third light-guiding dots 63 are shifted. After the light beam from the light-emitting element L' is introduced into the light guide plate 60, the plural first light-guiding dots 611, the plural second light-guiding dots 621 and the plural third light-guiding dots 63 are all illuminated. However, the checking result indicates that some of the plural second light-guiding dots 621 are illuminated, and the checking result indicates that no light beam from some of the third light-guiding dots 63 is detected or the positions of the third light-guiding dots 63 are shifted. According to standard product shown in FIG. 6A, the tester judges that the abnormal position is illuminated, or the tester judges that the illuminated position is not the predetermined position. According to the above judgement criteria, the tester judges that the covering layer 70 is not attached on the correct position. Under this circumstance, the light guide module is determined as a defective product.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A light guide module, comprising:
a base plate;
a light guide plate installed on the base plate, wherein the light guide plate comprises plural first light-guiding dots and plural second light-guiding dots;
a light-emitting element installed on a lateral edge part of the light guide plate; and
a covering layer, wherein the light guide plate is covered by the covering layer, and the covering layer comprises a non-shading region, a separation region and a shading region, wherein the separation region is arranged between the non-shading region and the shading region, and the non-shading region and the shading region are separated from each other by the separation region,
wherein the plural first light-guiding dots of the light guide plate are aligned with the non-shading region of the covering layer, the plural second light-guiding dots of the light guide plate are aligned with the shading region of the covering layer, and the plural second light-guiding dots are covered by the shading region of the covering layer.

2. The light guide module according to claim 1, wherein the light guide plate further comprises plural third light-guiding dots, and the plural third light-guiding dots are aligned with the separation region of the covering layer.

3. The light guide module according to claim 2, wherein when the plural second light-guiding dots are covered by the shading region of the covering layer, the plural third light-guiding dots are exposed to the separation region of the covering layer.

4. The light guide module according to claim 2, wherein the plural third light-guiding dots are arranged between the plural first light-guiding dots and the plural second light-guiding dots.

5. The light guide module according to claim 2, wherein the plural third light-guiding dots are arranged between the plural second light-guiding dots.

6. The light guide module according to claim 1, wherein the plural second light-guiding dots are aligned with an edge of the shading region of the covering layer.

7. The light guide module according to claim 1, wherein the plural first light-guiding dots, the plural second light-guiding dots and the plural third light-guiding dots are distributed on a whole plate of the light guide plate.

8. The light guide module according to claim 1, wherein a distribution density of the plural first light-guiding dots corresponding to the non-shading region of the covering layer is higher than a distribution density of the plural second light-guiding dots corresponding to the shading region of the covering layer.

9. The light guide module according to claim 1, wherein the light guide module further comprises a pattern layer, wherein the pattern layer is located over the covering layer, and the pattern layer comprises a text region and an opaque region, wherein the text region is aligned with the non-shading region of the covering layer, and the opaque region is aligned with the shading region and the separation region of the covering layer.

10. The light guide module according to claim 1, wherein the light guide module further comprises a bottom layer, wherein the bottom layer is arranged between the base plate and the light guide plate, and the bottom layer is an adhesive layer or a reflective coating layer.

11. The light guide module according to claim 1, wherein the covering layer is an adhesive layer or a light-shading coating layer.

12. A light guide module for a touch pad, the light guide module comprising:
a base plate;
a pattern layer located over a covering layer, wherein the pattern layer comprises plural text regions and an opaque region;
a light guide plate arranged between the base plate and the pattern layer, wherein the light guide plate comprises plural first light-guiding dot regions and plural second light-guiding dot regions, wherein the plural first light-guiding dot regions are aligned with the corresponding text regions of the pattern layer, and the plural second light-guiding dot regions are aligned with the opaque region of the pattern layer;
a covering layer arranged between the pattern layer and the light guide plate, wherein the light guide plate is covered by the covering layer, and the covering layer comprises plural non-shading regions, plural separation regions and plural shading regions, wherein the plural non-shading regions of the covering layer are aligned with the corresponding first light-guiding dot regions of the light guide plate, and the plural shading region of the covering layer are aligned with the corresponding second light-guiding dot regions of the light guide plate; and
a light-emitting element installed on a lateral edge part of the light guide plate,
wherein the plural first light-guiding dot regions of the light guide plate are exposed to the corresponding non-shading regions of the covering layer and the corresponding text regions of the pattern layer,
wherein the plural second light-guiding dot regions of the light guide plate are covered and shaded by the corresponding shading regions of the covering layer, so that the plural second light-guiding dot regions are not exposed to the opaque region of the pattern layer.

13. The light guide module according to claim 12, wherein each of the plural first light-guiding dot regions comprises plural first light-guiding dots, and each of the plural second light-guiding dot regions comprises plural second light-guiding dots, wherein a distribution density of the plural first light-guiding dots in each of the plural first light-guiding dot regions is higher than a distribution density of the plural second light-guiding dots in each of the plural second light-guiding dot regions.

14. The light guide module according to claim 13, wherein the plural second light-guiding dots in each of the plural first light-guiding dot regions are aligned with an edge of the corresponding shading region of the covering layer.

15. The light guide module according to claim 12, wherein the light guide plate further comprises plural third light-guiding dots, and the plural third light-guiding dots are aligned with the plural separation regions of the covering layer.

16. The light guide module according to claim 12, wherein each of the plural separation regions of the covering layer is arranged between the corresponding non-shading region of the plural non-shading regions and the corresponding shading region of the plural shading regions, and the corresponding non-shading region and the corresponding shading region are separated from each other by the corresponding separation region.

17. The light guide module according to claim 12, wherein the covering layer is an adhesive layer or a light-shading coating layer.

* * * * *